United States Patent [19]

Poch

[11] Patent Number: 5,152,003
[45] Date of Patent: Sep. 29, 1992

[54] RECORD MESSAGE DELIVERY SYSTEM
[75] Inventor: Neil Poch, Toronto, Canada
[73] Assignee: Tour-Mate Systems Canada Limited, Toronto, Canada
[21] Appl. No.: 799,731
[22] Filed: Nov. 22, 1991

Related U.S. Application Data

[63] Continuation of Ser. No. 422,812, Oct. 18, 1989, abandoned.
[51] Int. Cl.$^5$ ............................................. H04B 1/10
[52] U.S. Cl. .................................... 455/18; 455/33.1; 455/50.1; 455/66; 455/186.1; 364/419
[58] Field of Search ....................... 455/18, 50, 57, 49, 455/103, 186, 218, 33, 66; 364/419

[56] References Cited

U.S. PATENT DOCUMENTS

| 3,934,202 | 1/1976 | Missale | 455/50 |
| 4,054,741 | 8/1977 | Missale | 455/166 |
| 4,097,809 | 6/1978 | Miller | 455/11 |
| 4,163,123 | 7/1979 | Brodsky et al. | 455/617 |
| 4,457,019 | 6/1984 | Szabo, Jr. et al. | 455/50 |
| 4,724,478 | 2/1988 | Masuko et al. | 358/86 |

FOREIGN PATENT DOCUMENTS

| 188364 | 7/1986 | European Pat. Off. . |
| 2163773 | 7/1973 | Fed. Rep. of Germany . |
| 3715202 | 11/1988 | Fed. Rep. of Germany . |
| 3715203 | 11/1988 | Fed. Rep. of Germany . |

OTHER PUBLICATIONS

Patent Abstracts of Japan, vol. 12, No. 423, E680, abstract of JP63-15890 pub. Jul. 1, 1988.
Patent Abstracts of Japan, vol. 9, No. 56 E302, abstract of JP59-198034, pub. Nov. 9, 1984.
Nippon Denshin Denwa Kosha PCT Published Patent Application WO 8907374.

Primary Examiner—Curtis Kuntz
Assistant Examiner—Edward Urban
Attorney, Agent, or Firm—Wegner, Cantor, Mueller & Player

[57] ABSTRACT

The invention concerns a recorded message delivery system for use in museums or tourist attractions. The system supports multiple messages for example, one message per exhibit and a user operated message player may be programmed to receive messages in one of a plurality of languages. The messages may be transmitted, for example, on different frequencies of the FM band to be received and played by the receiver/message player. Messages are played without regard for sequence at the demand of the user who may choose any message by keyboard operation of a panel of the receiver. Thus, for example, by pressing key #5 the user may hear the message relating to exhibit #5 in the language for which the receiver/player is programmed. Frequencies may be reused in different locations of the museum or attraction.

11 Claims, 3 Drawing Sheets

RECORD MESSAGE DELIVERY SYSTEM

This application is a continuation of U.S. application Ser. No. 07/422,812, filed Oct. 18, 1989, now abandoned.

BACKGROUND OF THE INVENTION

1. Field of the Invention

This invention relates to a recorded message audio delivery system for use by an individual listener.

2. Background of the Invention

The presentation of tourist and/or other exhibitions has always been a problem. Visitors to exhibitions of any type require information concerning the exhibits. Such information may be provided by guide books, by written notices attached to each exhibit, verbally by guides accompanying a conducted tour, verbally by a pre-recorded announcement either individually made from equipment carried by the visitor or centrally in the location of the exhibit. Generally verbal presentation is preferred since the visitor's visual attention may then remain wholly on the exhibits.

There have been various difficulties in making a satisfactory verbal presentation. Among these are the fact that it is difficult to provide for simultaneous presentations in different languages and that it has been necessary for visitors to follow a set route conforming to the sequencing of the presentation. This may be true whether or not a guide person gives the presentation or whether it is tape recorded.

If individually portable tape recording apparatus is carried by each visitor, the problem of language may be theoretically solved by providing the visitor with apparatus which delivers messages in the language of his choice. However, this entails the provision of a large amount of apparatus by the management of the respective exhibition to allow for appropriate choice of apparatus specific to a particular language.

While some exhibitions are highly profitable tourist attractions, a very large number are cultural museums ("museums" is used here in its widest sense to mean any place of study including buildings, display grounds, gardens, battlefields or parts thereof, in which are preserved or exhibited objects of permanent interest). Often such museums are run by charitable organizations or on low budget government funding. In neither case is a large amount of money usually available for investment in large quantities of expensive apparatus.

With the expansion of the tourist industry, some exhibitions have been using individually portable message announcing systems which are operated to remotely from transmitters in each of several regions through which a visitor passes. The transmitters may transmit, for example, on the AM broadcast band of frequency or on the infrared wave band. Such devices have improved the form of presentation somewhat in that visitors may proceed through the exhibition of their own speed and, to an extent, may choose their route. However, it is still not possible for them to choose to hear specific information about a particular exhibit, nor is it possible to program different language versions of a tour alternately on the same device. Thus, in at least some of these systems, the user is not able to choose the desired message, and the number of messages per area is typically limited to one which covers the entire area including multiple exhibits. Such message may be too long for the convenience of the user or may lack detail.

Although it has not been possible for a listener to choose to hear any one message in the language of his pre-selected choice, at least one attempt has been made directed towards solving this problem. Such attempt is believed to have involved the use of radio frequency bands normally reserved for use by the hearing impaired. The use of such bands, as with the use of any other radio wave bands used, necessarily limit the number of different frequencies utilizable for transmission of different messages from a transmitter without interference. Nevertheless, an attempt was made to provide a choice of a very few, (believed less than four) different transmission frequencies which the listener might tune. It is believed that any practical embodiment of this concept is not now available.

SUMMARY OF THE INVENTION

The inventor in the present case approached the problem from a different angle than that taken by prior operators in the field.

The inventor took the view that multi-channel propagation techniques might be used to overcome some of the previous difficulties. The use of such techniques presented immediate apparent difficulty due to the possibility of interference with commercial interests such as a radio. The inventor concluded that conflict with commercial radio having rights to certain frequencies might be avoided by the use of low power sufficient for use in localized regions but not so great as to cause problems with radio broadcasting authorities. Problems of interference with the message transmission by high powered transmission from commercial radio may be dealt with by blocking the commercial transmission.

As an example, the inventor concluded that use of the FM band should not be dismissed as impracticable since it offered advantages in providing a large number of frequencies to which reception might be tuned.

The inventor, moreover, appreciated that the increased cost in production of a large number of discrete messages and provision of receivers having tuners for listener selecting a message by entering a number might be offset by the provision of receivers which might each be programmed to receive messages in only one language chosen by the listener and reprogrammable to another language as required. If each receiver is capable of such versatility the actual cost of equipment may be reduced to a minimum.

Still further the inventor appreciated that the cost of the equipment might be reduced still further by storing the messages for transmission in a storage medium which does not need moving into different positions to play the messages. Thus messages may retrieved with negligible wear and tear and negligible risk of malfunction. Thus the inventor envisaged storing the messages in digitized form on a computer chip.

Accordingly there is provided a system for delivery of prerecorded messages in response to selection by a listener, comprising; recorded messages stored in computer memory, different messages in one language being associated with a message identification datum and translations of any one message being associated with the message identification datum for said any one message; and each translation of any one message being associated with the message identification datum for said any one message; a transmitter settable to transmit each message in one language on separate non-interfering frequencies in a locality cell and to transmit translations of each message on separate non-interfering frequencies; at least one receiver programmable to receive transmitted messages in one language, and reprogrammable to receive transmitted translated messages in another language, by allocation of a set of reception frequencies for the receiver corresponding to the transmission frequencies for the messages or for translated messages in said other language; and manually operable selection means to select a receiver setting whereby a reception frequency is manually selectable by the listener in accordance with message identification indicia.

The power of the transmitter, for practical purposes be sufficiently low as to avoid interference by transmissions produced using the system of the invention with commercial radio.

When an operator enters the identification indicia or control panel of a receiver, the system maps that number to the transmitter frequency which contains the desired message in the desired message in the desired language. Two users, desiring the same message but in different languages, would enter the same message number but would receive the respective messages on two different frequencies.

The inventor has also envisaged that the system may transmit on a power low enough to allow, when a large number of messages are involved, frequency to be reused within the confines of the environment.

Thus an example of aspects of the invention, in operation might involve an art gallery to which the visitors included different nationalities. A German speaking visitor, a French speaking visitor and an English speaking visitor will be referred by way of example but it will be appreciated that many other languages may be involved and the number of such languages is mainly dictated by demand and expense. Moreover, while an art gallery is exemplified the system is utilizable for many other environments some of which will be discussed briefly below.

The FM band is presently attractive for use in the invention for regulatory and economic reasons. It includes many other bands than the FM commercial broadcast band (88.1–107.9 MHz). In the near future, it is envisaged that it may be attractive to produce systems above 1 GHz - eliminating many system issues (interference, frequency reuse, number of channels, etc.).

If the FM band is to be used, conflict with other channels may be avoided by being able to use locally unassigned channels, i.e. the system will not be overpowered by local channels but may operate on an out of town channel because it will be weak relative to the immediate vicinity of the transmitter. Lower power operation may limit the reception range of the particular message aiming to keep it within the confines for the museum.

The visitors to the art gallery may be each provided with an FM radio receiver, hereinafter referred to as a "wand". In most environments, such as the exemplified art gallery tour the wand would be battery powered so that there are no trailing wires. The wands are adapted to receive transmissions from an FM transmitter operating at sufficiently low power so as not to interfere with any commercial broadcasting station and, in some countries, at sufficiently low power so as not to contravene any regulations concerning interference with commercial broadcasting.

Discrete prerecorded messages in each language, in this example in French, German and English, may be stored in digitized form on a computer chip. This form of storage may have at least two distinct advantages over tape, or other recordings. First, in receiving messages from the chip there are no moving parts and negligible wear and tear on the system. More importantly, it is easy to access the chip for retrieval of any message at any time.

The transmitter retrieves messages from the chip and transmits retrieved messages on carefully selected prechosen non-interfering frequencies as will be further discussed.

Each exhibit in the gallery or other museum or environment may be provided with a separate message in each of the languages to be used and each exhibit may be identified to the visitor by an identification mark which is conveniently a number. This identification mark may also be used to identify messages relating to that exhibit and translations of that message language of the message.

Each wand is programmable to any of the available languages.

Thus the three visitors will be provided with wands programmed for French, German and English. The programming of each wand is changeable and may be carried out on site. Conveniently, a unit is provided to carry out the functions of battery charging and programming, so that a visitor may be provided with a charged wand custom programmed to receive the language of his choice. However, it will be appreciated that programming and charging are functionally separate tasks and their provision within one unit is for convenience only.

Once provided with a charged programmed wand the visitors may wander at will among the exhibits, listening to information only when they wish it and relating to the specific exhibit or a small group of exhibits in which they are interested. Moreover, the information will be provided in a language which they may understand.

Thus, if all three visitors are in a close group inspecting say, exhibit #6, each one of them may activate a selector marked for #6 on his wand. Each wand will receive a similar message but in a different language and a message on separate non-interfering frequencies.

The choice of the non-interfering frequencies is deliberately chosen as the transmitting frequencies for similar messages in different languages at the same location. The transmitting frequencies for different messages in the same language should also be non-interfering. From exhibit #6 it is not necessary to visit exhibit #7. The visitor may go forward sequentially or non-sequentially or retrace his tracks to an earlier exhibit which interested him.

To further explain the operation of the system, possible variations of the above example will now be considered, partially in disclosure of the invention and partially to explain the principles involved in the choice of the frequencies chosen at the transmitter and programmed at the receiver.

If all three visitors have wands programmed to, say English, and each visitor chooses to inspect different exhibits, say #5, #6 and #7 in close proximity to one another, then each visitor will activate a selector marked for exhibits #5, #6 and #7 respectively. Each visitor will hear only the message for the particular exhibit which he is inspecting since the frequencies chosen for transmission are chosen so as not to interfere with each other.

If an additional visitor is inspecting, say exhibit #5 but is listening in, say, French, he will activate the same selector on his wand as does the visitor who is listening on his wand in English. However, due to programming of the wands the visitor who is listening in French will select a different frequency from that selected by the visitor who is listening in English. The use of FM frequencies is important due to the number of available non-interfering frequencies. Of course, when using the FM band it is important that the low power transmissions of the system do not interfere with any commercial frequencies in use. This may be easily accomplished by limiting the power.

The reverse problem, i.e. potential interference of the system transmissions by commercial radio, is more difficult. The inventor has envisaged solving this problem by means of blocking reception on the frequency when interference occurs. Thus a system transmission may be accompanied by an identification signal for the transmission. If a non-identified transmission is detected reception may be blocked. This will have the effect of also blocking the system transmission but it is believed this is less objectionable than garbled transmission. The problem may substantially be avoided by suitable choice of frequencies.

The use of FM frequencies is that reception may be less impeded by obstructions between the transmitter and receiver than is the case when using AM frequencies or infrared beams. In any case infrared beams are obstructed by sunlight if used out of doors. Moreover, the use of FM frequencies may make it convenient to operate the system on a cellular basis somewhat similar to the basis on which cellular telephones operate. As visitors move from one cell to another frequencies may be reused for different messages. Since visitors may actuate selectors which do not correspond to exhibit indicia, it is wise to block reception on any frequencies associated with these selectors. Thus, if the wand is programmed to receive messages on frequencies 40, 45, 50, 55 and 60 but only four recorded messages corresponding to exhibits 1, 2, 3 and 4 are available on frequencies 40, 45, 50 and 55, reception may be blocked on frequency 60. Alternately, programming means may be provided to program frequencies of zero or the like to correspond to all selector positions to which a message frequency is not assigned.

The selectors of each wand are preferably stationary pressure sensitive selectors to minimize wear due to moving parts. The wand is conveniently designed to include a contact portion having access means for battery charging and for programming. The plug portion may be plugged into a socket of charging/programming bank for storage and for distribution. The charging/programming bank may be located at any convenient location, but is conveniently near to a visitor entry zone. It may be designed as a self-serve distribution point for wands from which visitors select a wand when they enter and deposit it when they leave. Supervision will be necessary to supervise the appropriate programming of wands. However, if no wand is located in a socket marked for a desired language, it should cause very little delay to take a wand from another socket and reprogram it as desired.

BRIEF DESCRIPTION OF THE DRAWINGS

An embodiment of the invention will now be described with reference to the drawings, in which.

DETAILED DESCRIPTION OF PREFERRED EMBODIMENTS

A transmitter used in a system embodying the present in which may be of any suitable design and is within the competence of anyone skilled in the art.

Figure 1:
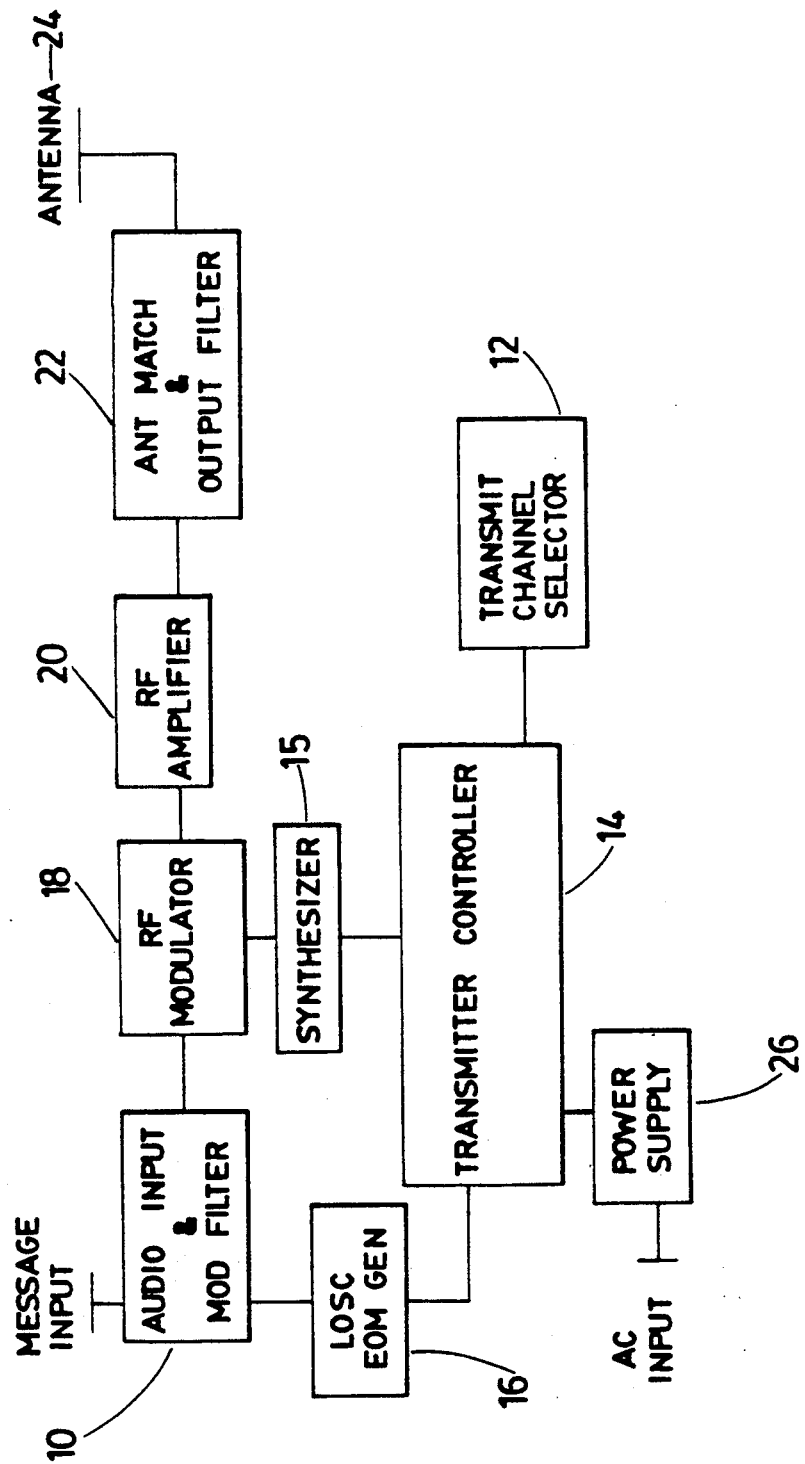
FIG. 1 is a block diagram illustrating the transmitter sub systems.
Figure 2:
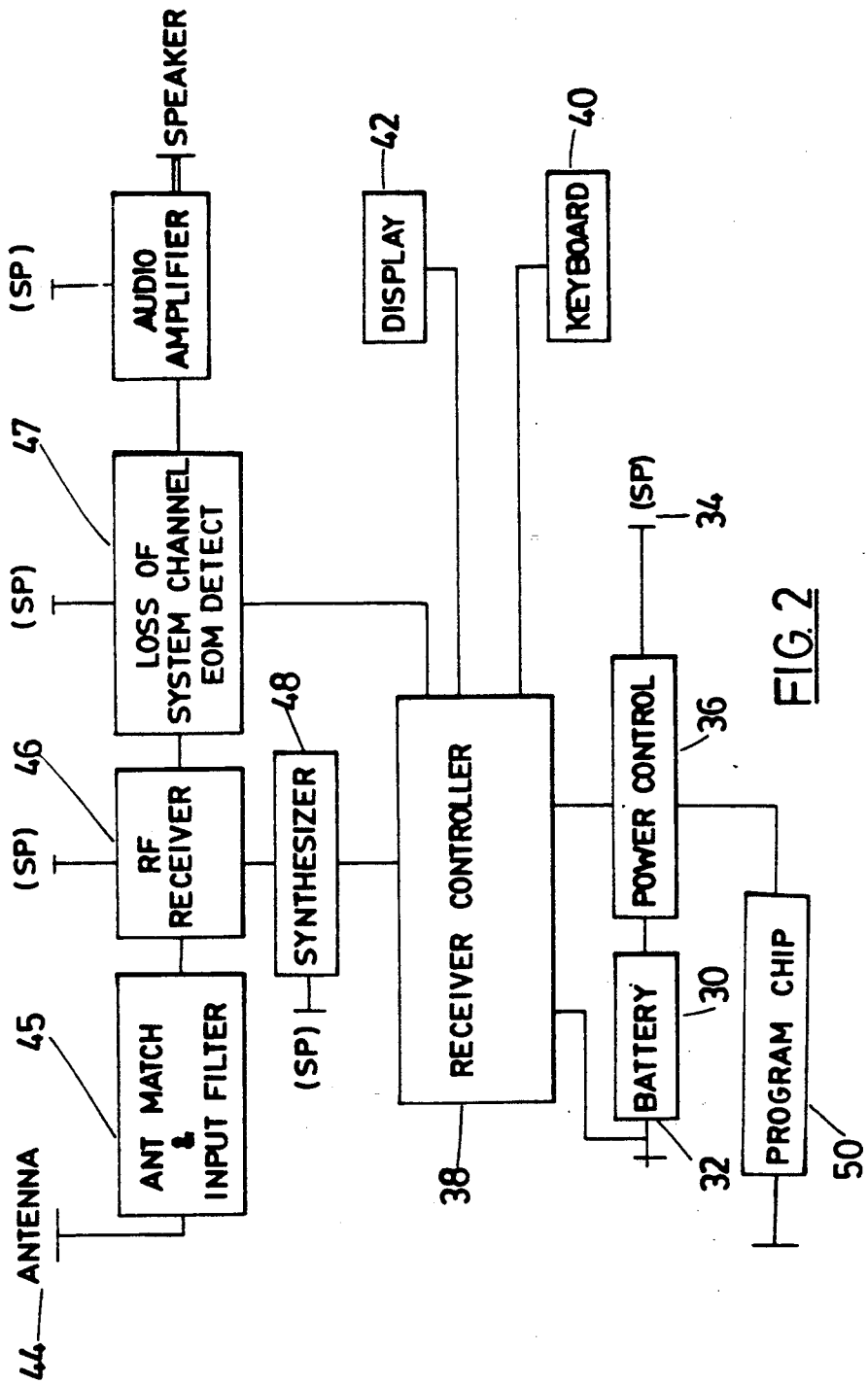
FIG. 2 is a block diagram illustrating the receiver sub systems.

The transmitter may be an rf, infra-red, spread spectrum or time division multiplexed, transmitter i.e. the transmitter may utilize any propagation media capable of supporting multiple channels example based of standard rf FM transmission is broadcast band should be recognized that system is not limited to the method but can be applied to any multi-channel propagation technique capable of supporting multi-channel (voice or data) operation such as infrared, spread spectrum, tdma. Thus a conventional FM transmitter, may be used such as one as depicted in the block diagram of FIG. 1. Such a transmitter may comprise an audio input 10, control circuits 14, a synthesizer 15, for RF frequencies, a modulator 18, an amplifier 20, and a power supply 26 and an output antenna 24. Additionally, conventional filters, such as input filters at the audio input 10, and an output filter antenna matching means 22 may be provided. Since more than one carrier frequency is required, a transmitter channel selector is also provided. Each such transmitter arranged to transmit or its selected frequencies is arranged to transmit over a pre-chosen region in accordance with the power supply. In the previously used example of the art gallery, if exhibits #4, #5, #6, and #7 are grouped together a single transmitter may be suitably located to transmit messages on four non-interfering frequencies in English, to transmit translations in French or another four non-interfering frequencies, and to transmit four translations in German or yet another four frequencies, or yet another four. Such a region may be regarded as a "cell" are with hereinafter be referred to as such. It is to be emphasized that the choice of languages of each translation and the number of frequencies used per cell is merely a matter of convenience.

An additional feature of the transmitter which is of some importance as an optional feature of the inventor is means 16 to provide for an end of message signal. An oscillator is provided to generate an end of message signal which is transmitted with the audio signal. The end of message signal need not be in the audio range. Its purpose is to provide a signal to the receiver to switch off after delivering the message a pre-determined number of times.

A further modification includes the provision of means for the generator of a continuous tone for inclusion of system identification message either tone or data message transmitted at a level or at modulation rate inaudible to the user to serve as a system identifier. This may allow a receiver to confirm that receive signal is being transmitted by the system and that the message should be presented to the user. It may also indicate an end of message cycle before recycling.

Figure 3:
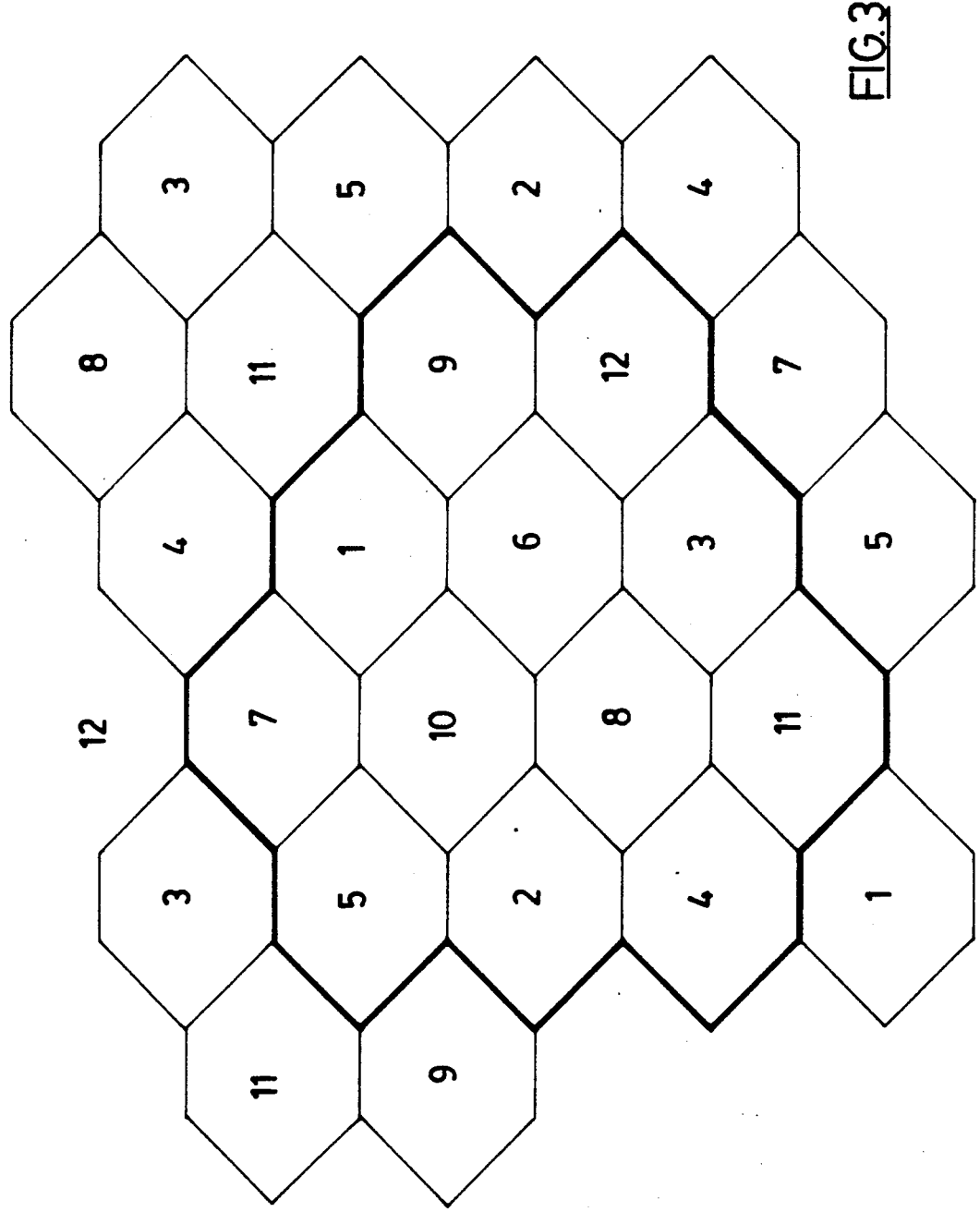
FIG. 3 is a diagrammatic sketch of a cellular layout.

Because the transmitters operate at such low power, for example 50 milliwatts, further transmitters will be necessary if any significant region is to be covered. In theory it is possible, when moving into the adjacent region covered by a second transmitter, to reuse the frequencies of the first transmitter for different messages in the second region. In practice if this is attempted, either reception near the margins of the region may be unacceptably poor or there will be interference of transmissions between the cells. If two different messages are transmitted on the same frequency from two adjacent cells and then coverage from each cell overlaps the other then distortion will result at the transition boundary and the user may receive the other message if they walk into the adjacent cell. Thus, transmitters in adjoining cells should preferably operate or different frequencies. Moreover, if quality transmissions is to be maintained within cells it may not always be possible to re-use frequencies, even when a cell in which it is desired to test frequencies is spaced from the cell in which the frequencies are previously used by a distance corresponding to another cell. However, frequencies may usually be re-used when alternately spaced and one suitable cell pattern for such use is shown in FIG. 3. FIG. 3 shows a pattern for twelve (12) cells #1 to #12.

Assuming that each consecutively numbered cell frequencies are to be reused, no consecutively numbered cells must adjoin one another. Thus cell #2 must be spaced from each of cells #1 and #3 by at least one other cell. When this spacing is observed for all the twelve (12) consecutively numbered cells, a group of cells as surrounded by the solid black line in FIG. 3 may be formed. This group of cells may be repeated as often as desired in the same patter.

The spacing of one cell between cells in which frequencies are re-used is to a practical minimum requirement for reusing frequencies. It is, however, preferred only to re-use frequencies in each group of cells. Thus cell #1 would always utilize the same frequencies and each cell #1 is well separated from any other cell #1. A similar situation exists for each other cell in the group.

A message storage unit may comprise digital voice storage in solid state memory. Thus moving mechanical parts and fragile storage media such as audio tape may be avoided. The message storage unit may include the system identification message either a tone or data message transmitted at a level or modulation rate inaudible to the user to serve as a system identifier. This allows receiver to confirm that receive signal is being transmitted by the system.

Receivers for receiving transmissions from the transmitters are also largely conventional and comprise a power supply 30 which is preferably a rechargeable battery, control means 36 for the battery with a switch 34, receiver control circuits 38, a synthesizer 48 for the receiver frequency which is frequency is changed through user intervention from keyboard 40. Signal from the synthesizer 48 and from the input from an antenna 44 and front end matching and input filter means 45 is input to 16. The heart 46 of the receiver comprises conventional mixer and intermediate frequency amplification stages. Downstream of the mixer and the i.f. amplifier is a detector 47 for loss of frequency and for detecting the end of message signal.

A display 42 may be provided on the receiver to indicate on/off condition and which keyboard selection has been made.

An important feature of the receiver which is not conventional is frequency selection means 50 which activates appropriate control circuits 38 in response to keying by the user of keyboard 40 to cause the local oscillator of synthesizer 48 to operate at the appropriate frequency. The frequency selection means 50 is programmable and reprogrammable such that, for one programming, certain keyings select corresponding frequencies and, for other programmings, the same keyings select other corresponding frequencies. Thus, when programmed for one languages, user input of the keyboard as indicated by indicia or the exhibits will only result in messages in the one language. The selection means 50 may be reprogrammed to a different language where desired. Conveniently access to the selection means 50 for reprogramming is through any suitable plug and socket access or other access.

The control means 40 and selection means 50 accept programming information, translate a message number to a programmed operating frequency, control sub-systems (synthesizer, charge indicator, etc.) for proper operation and reception of message, and monitor charger/programming inputs share common connection to detect if receiver is in a charging or programming unit. If the controller detects that the receiver is being changed the controller erases programmed data requiring the receiver to be reprogrammed. This ensures receiver is properly programmed for user language and prevents unauthorized reissue of receiver to a user without proper accounting use. The controller may also verify program data and verify transmitted system identification.

The selection means 50 may be any easily reprogrammable firm ware, for example an EEPROM. A program for the operation of the selection means 50 is simple in concept. Thus, for example, if the keyboard is a ten digit keyboard and selections of frequency are possible for user keyings of 00 to 99, then:

if language A is selected then for example, for any cell,
keying 01 selects frequency 26;
keying 02 selects frequency 36;
keying 03 selects frequency 46;
For cell 2,
keying 04 selects frequency 56
keying 05 selects frequency 66
keying 06 selects frequency 76
For cell 3,
keying 07 selects frequency 86
keying 08 selects frequency 96
keying 09 selects frequency 16
if language B is selected keying suitably be:
keying 01 selects frequency 13
keying 02 selects frequency 27
keying 03 selects frequency 03 etc.

Since cells 1 and 2 are separated from each other by at least one other cell the repetition of cell #2 frequencies in cell #1 may not cause interference problems. Evidently, numerous variations and safeguards are possible.

A programmer may physically have one slot or socket per language into which a wand may be inserted for programming. The programmer may store channel set for each language; accepts changes to sets from an external computer or by installation of a memory integrated circuit which contains channel data; detect that a wand has been placed into slot or socket, and program the wand and verify programming by reading a check sum sent by the receiver which is calculated from the programmed data. At this point it is discovered that the wand is not properly programmed the programmer may provide an audible response to the operator to indicate programming status - successful or unsuccessful, track usage of the wand, index an internal counter per programming attempt, and index an internal counter by language.

We claim:

1. A system for the delivery of pre-recorded messages in response to selection by a listener, comprising:
   recorded messages stored in a computer memory, each message being present in a plurality of languages, and each message irrespective of its language being associated with a message identification datum;
   a transmitter settable to transmit each message on separate non-interfering frequencies in a locality cell, each of the messages in different languages being transmitted on separate non-interfering frequencies in each locality cell;
   at least one receiver, each receiver including a programmable and reprogrammable computer microchip and having a plurality of receiving channels each for reception of a particular frequency, the receiver being programmable and reprogrammable for reception of particular frequencies associated with any messages in a chosen one of the languages; and
   manually operable selection means to select a particular reception channel in accordance with a message identification datum, thereby to receive in the chosen language the message associated with the message identification datum.

2. A system for delivery of a prerecorded message in response to selection by a listener as claimed in claim 1, in which the selection means is a key pad.

3. A system for delivery of a prerecorded messages in response to selection by a listener as claimed in claim 2, in which the key pad is a touch sensitive key pad.

4. A system for delivery of a prerecorded messages in response to selection by a listener as claimed in claim 2, in which the key pad comprises ten keys numbered from 0 to 9.

5. A system for delivery of a prerecorded messages in response to selection by a listener as claimed in claim 4, in which each channel requires actuation of two keys.

6. A system for delivery of a prerecorded messages in response to selection by a listener as claimed in claim 1 in which the receiver is programmable to block reception on a frequency for which there is no transmitted message.

7. A system for delivery of a prerecorded messages in response to selection by a listener as claimed in claim 1, in which the receiver is programmable to allocate a frequency of 0 MHz for surplus channels.

8. A system for delivery of a prerecorded messages in response to selection by a listener as claimed in claim 1 in which each receiver includes squelch means to block reception of any frequency when interference occurs.

9. A system for delivery of a prerecorded messages in response to selection by a listener as claimed in claim 1, in which the transmitter transmits an end of message signal with each message and the receiver is programmable to switch off when the end of message signal has been received a pre-chosen number of times.

10. A system for delivery of a prerecorded messages in response to selection by a listener as claimed in claim 1, in which additional transmitters are provided settable to transmit messages on separate non-interfering frequencies in other locality cells, the frequencies of the additional transmitters being settable to those non-interfering with those of transmitters of nearby cells.

11. A system for delivery of a prerecorded messages in response to selection by a listener as claimed in claim 10, in which a transmitter is provided in each locality cell in a pattern such that transmitters transmitting on similar frequencies are separated from each other by a sufficient distance to allow reuse of frequencies.

* * * * *